United States Patent [19]

Beckmann

[11] 4,360,102
[45] Nov. 23, 1982

[54] CONVEYING APPARATUS FOR USE IN MINERAL MINING

[75] Inventor: Klaus Beckmann, Lünen, Fed. Rep. of Germany

[73] Assignee: Gewerkschaft Eisenhutte Westfalia, Fed. Rep. of Germany

[21] Appl. No.: 181,805

[22] Filed: Aug. 27, 1980

Related U.S. Application Data

[63] Continuation of Ser. No. 7,795, Jan. 30, 1979, abandoned.

[30] Foreign Application Priority Data

Feb. 9, 1978 [DE] Fed. Rep. of Germany ....... 2805431

[51] Int. Cl.³ ...................... B65G 19/18; E21D 23/00
[52] U.S. Cl. .................................. 198/729; 198/735;
198/831; 299/33; 405/300
[58] Field of Search ................ 198/729, 735, 831;
405/300; 299/31, 33

[56] References Cited

U.S. PATENT DOCUMENTS 2,795,934  6/1957  Jenkins ............................. 405/300
2,795,935  6/1957  Fitzgerald ........................ 299/33 X
3,777,876  12/1973  Schreier et al. .................. 198/729

Primary Examiner—Jeffrey V. Nase
Attorney, Agent, or Firm—Thompson, Birch, Gauthier & Samuels

[57] ABSTRACT

Conveying apparatus for use in conveying mineral ore employs a curvilinear channel section or pan which joins straight groups of similar channel sections joined end-to-end together. A scraper-chain assembly circulates along the channel sections in upper and lower runs. A unit with a hollow housing is combined with the curvilinear channel section and this unit has an upstanding hollow pillar forming a hub on which two rollers are mounted for independent rotation. The rollers are shaped to engage with the scrapers of the scraper-chain assembly to guide the latter during its passage along the curvilinear channel section. To enable the roof of the mine working to be adequately supported over the zone in which the curvilinear section and unit are installed, a roof support with alternately shiftable hydraulic props is located within the hollow hub of the unit. The props are connected to a multi-part roof bar and extend through an elongate aperture in the housing top wall. The props can be shifted in successive steps independently of the housing and the conveyor channel sections.

11 Claims, 2 Drawing Figures

CONVEYING APPARATUS FOR USE IN MINERAL MINING

This is a continuation of application Ser. No. 7,795 filed Jan. 30, 1979 now abandoned.

BACKGROUND TO THE INVENTION

The present invention relates in general to conveying apparatus for use in transporting mineral ores, especially coal, in mineral mine workings.

It is well known to employ a scraper-chain conveyor composed of channel sections or pans joined end-to-end and a scraper-chain assembly moved along the channel sections, usually in upper and lower runs. In some installations, a conveyor of this type is arranged alongside the mineral or coal face and discharges mineral ore onto another conveyor in a roadway. In other installations, with which the present invention is mainly concerned, a group of straight channel sections is installed in both the mine working or longwall working and the roadway gallery and a curved channel section connects the groups of channel sections together. In such apparatus, it is necessary to provide guidance for the scraper-chain assembly in its passage over the curved section. One form of known guidance device employs discs or wheels rotating about a fixed fulcrum and engaging with the scrapers of the scraper-chain assembly. Examples of known guidance devices are described in the journal Glückauf 1976, pages 873 to 877, and in German Pat. Nos. 2065424 and 2051384. It has been established in practice that efficient guidance is realized if four or more scrapers engage with the guidance discs or wheels at any one time. This means that with the normal spacing between adjacent scrapers, the diameter of the guidance discs or wheels is considerable and hence the guidance device takes up a relatively large space. The guidance device can be reduced in size if the scrapers are positioned closer together than is normal. However, a scraper-chain assembly with closely-spaced scrapers leads to higher costs and excessive weight. Another problem encountered with known apparatus is that of adequately supporting the roof of the working over the critical region where the longwall and roadway meet, especially where the guidance device takes up a great deal of space.

German Pat. No. 2013089 describes another guidance device wherein rollers are supported for rotation on their inner peripheries and a roof support is accommodated inside a compartment of the guidance device. The present invention has as its object to provide apparatus similar to that described, but improved mainly in respect of the roof supporting function.

BRIEF DESCRIPTION OF INVENTION

In accordance with the invention, rollers are provided for contacting and guiding the scrapers of the scraper-chain assembly during its passage along a curvilinear channel section and these rollers are rotatably mounted on one common bearing housing which has an internal hollow region accommodating a support movable in successive steps independently of the bearing housing and the scraper-chain conveyor or its curvilinear channel section. By these measures, it is possible for the roof to be supported adequately at all times and even when the housing and conveyor channel section(s) are being moved to follow the working progress. It follows that the internal region or space in the bearing housing must be of sufficient size to allow shifting of the support.

In one aspect, the invention provides conveying apparatus for use in mineral mining; said apparatus at least including a curvilinear channel section, a scraper-chain assembly movable along the channel section, a housing, at least one roller rotatable within the housing for contacting and guiding the scrapers of the scraper-chain assembly during passage along the channel section and a support, located partly in the housing, the support being braceable between the floor and the roof of a mine working and displaceable independently of the housing and the channel section.

In another aspect, the invention provides conveying apparatus comprising a curvilinear channel section, a scraper-chain assembly movable along the channel section in upper and lower runs, a housing with an upstanding hollow hub portion, rollers independently rotatably mounted on the hub portion for contacting and guiding the scrapers of the scraper-chain assembly during passage along the channel section in the upper and lower runs and a roof support accommodated in the hub portion, the roof support being braceable between the roof and floor of a mine working and displaceable in successive steps independently of the housing and the channel section.

The support itself may take a variety of forms, but preference is given to a support with two hydraulic props which can be retracted or extended independently. The props can be connected to and suspended from a common multi-part roof-bar or similar roof engaging structure and a shifting ram serves to displace one prop relative to the other. More particulary, the props can be connected to respective components of the roof bar, which components are relatively movable in the direction of shifting of the support. In this way, one prop can remain set to brace part of the roof girder against the roof while the other part is displaceable with its retracted prop lifted clear of the floor. Additional guidance devices can be provided to guide the props during shifting.

The rollers are shaped, with external peripheral grooves, for example, and dimensioned to engage with the ends of the scrapers, as is known, and the housing can be designated to protect the rollers and their bearings. It is preferable for the housing to be constructed from a number of interconnected parts, say annular segments, since this would facilitate transportation and assembly of the apparatus. To hold the housing and the channel section on the floor and to stabilize the apparatus, retaining devices, e.g., plates, can be located on the props to bear on the housing. Usually, the housing would be rigidly connected or structurally united with the curved channel section and connection means on the housing may connect with a shifting ram, capable of displacing the housing and channel section independently of the support.

The housing must be constructed with sufficient rigidity and stability to cope with the shifting forces pertaining to the support. In one embodiment of the invention, the housing has a top wall provided with an elongate aperture aligned with the direction of displacement of the support.

The invention may be understood more readily and various other features of the invention may become apparent from consideration of the following description.

BRIEF DESCRIPTION OF DRAWING

An embodiment of the invention will now be described, by way of example only, with reference to the accompanying drawing, wherein.

DESCRIPTION OF PREFERRED EMBODIMENT

Figure 1:
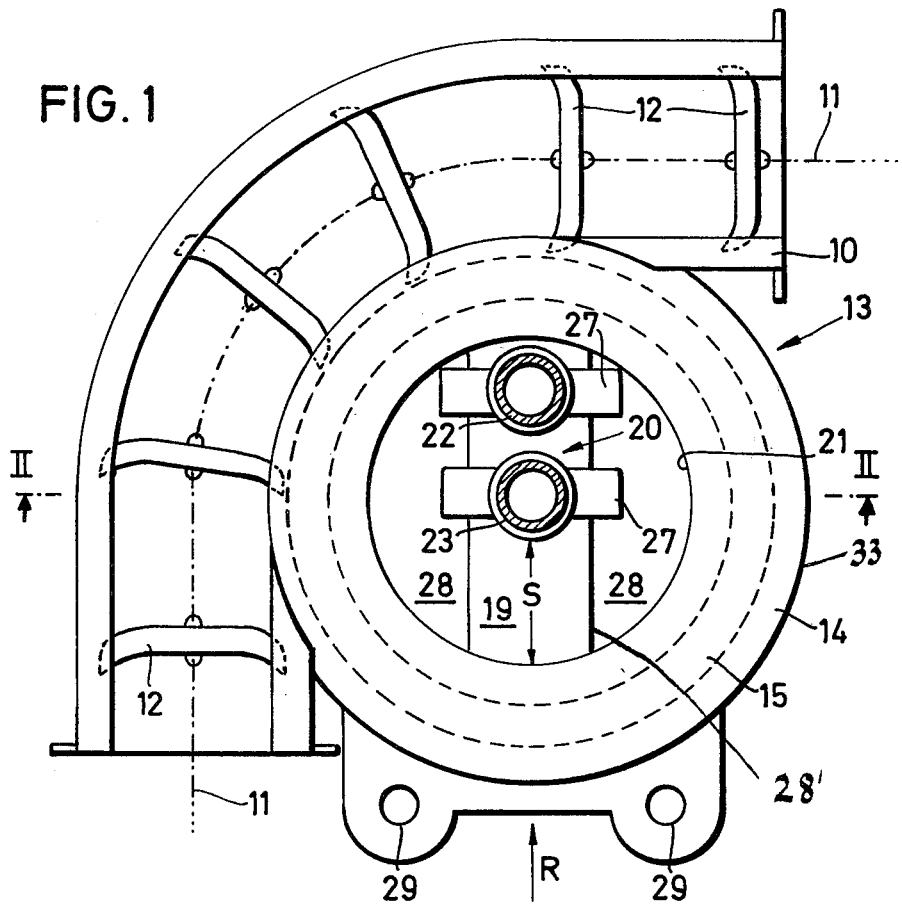
FIG. 1 is a plan view of part of a mine installation and conveying apparatus made in accordance with the invention.
Figure 2:
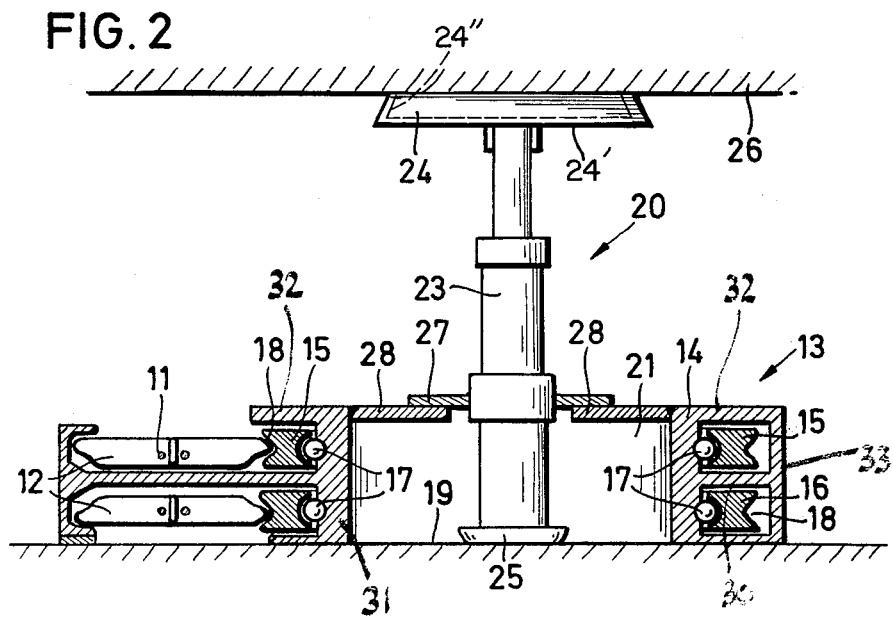
FIG. 2 is a sectional view taken along the line II—II of FIG. 1.

A mine installation employs a conveyor which is made up from pans or channel sections, joined end-to-end in known manner. A scraper-chain assembly made up of scrapers attached to a chain is moved along the channel sections to transport material, usually mineral ore, therealong. The scrapers are designated 12 and the chain is designated 11 in the accompanying drawing. As shown in FIG. 2, the scraper-chain assembly runs along above and below a floor of the conveyor in conventional conveying and return runs. The conveyor section 10 depicted in the drawing is a curvilinear section interposed between straight channel sections (not shown) extending at 90° to one another. The section 10 is especially useful in connecting part of the conveyor located in a longwall coal working to part of the conveyor located in a gallery or roadway at one end of the longwall working. The section 10 is structurally combined and operably associated with a support and guidance unit 13. The unit 13 has an annular housing 14 rotatably supporting rollers 15,16. More particularly, the rollers 15,16 are supported for independent rotation on individual bearing races 17 mounted to an upstanding hub portion 31 of the housing 14. The hub portion 31 of the housing 14 joins an outwardly-extending top wall region 32 projecting over the rollers 15,16 and the bearing races 17. The hub portion 31 also joins segmental inwardly-extending top wall regions 28. An elongate gap or aperture 28' is provided between the top wall regions 28. As shown at the left-hand side of FIG. 2, in the illustrated embodiment part of the hub portion 31 is joined to the floor of the conveyor section 10 so that this part of the hub portion 31 and part of the top wall region 32 effectively form a continuation of the side wall of the conveyor section 10. An arcuate outer side wall 33 and cross piece 30 define chambers between the hub portion 31 and the side wall 33 (as shown at the right-hand side of FIG. 2) in which the rollers 15,16 run outside the conveyor section 10. The rollers 15,16 have an external radius of curvature matching that of the conveyor section 10 and the external peripheral regions of the rollers 15,16 are shaped with grooves 18, which correspond to the shape of the ends of the scrapers 12. The scrapers 12 thus locate with the rollers 15,16 which rotate about the hub portion 31 to guide the upper and lower runs of the scraper-chain assembly in their passage over the section 10. As shown in FIG. 1, some four scrapers 12 engage the rollers 15,16 in the upper and lower runs during operation. The housing 14 is fitted with external connecting devices 29 for connection with one or more shifting rams used to displace the conveyor section(s) and the housing 14 to follow the working progress. The central region 21 of the housing 14 inside the hub portion 31 is hollow and accommodates a hydraulic support 20. The support 20 is displaceable in steps in the direction of arrow R aligned with the aperture 28'. There is sufficient clearance in the region 21 to permit the displacement of the support 20 in steps S. In the illustrated embodiment, the support 20 comprises two hydraulic props 22,23 resting on the floor 19 of the working through foot plates 25. The props 22,23 are connected to a multi-part roof bar structure 24 which can be braced against the roof 26 of the mine working. The roof bar 24 may be composed of telescopic or otherwise relatively movable components 24', 24''; each of the props 22,23 being flexibly connected to a respective one of the roof bar components. The props 22,23 may also be connected at their lower regions by a girder with relatively-displaceable parts but, in any event, the props 22,23 are also connected to a conventional double-acting hydraulic shifting ram (not shown) which effects alternate movement of one prop relative to the other in the shifting direction R in generally known manner. During shifting, the prop to be displaced is retracted while the other prop braces the roof bar 24 against the roof 26. Thus, the retracted prop has its foot plate 25 lifted from the floor 19 and becomes suspended from the roof bar 24 while the other prop serves as an abutment for the shifting forces. When the conveyor section 10 and the unit 13 are shifted up in the direction of arrow R the same shifting step S can be adopted and the support 20 can remain in position. The support 20 can thus be re-positioned independently of the conveyor section 10 and the unit 13.

The props 22,23 carry plate-like retaining devices 27 which rest on the segmental top wall regions 28 which project partially over the region 21. The devices 27 hold the entire structure on the floor 19 when one or both props 22,23 are set. Additional guidance devices located in the housing 14 and/or on the top wall regions 28 may be provided to guide the support 20 during its shifting movements.

The housing 14 is preferably constructed from a number of parts, such as annular components, screwed or otherwise fixed together.

Instead of adopting the support 20, as described, other types of displaceable supports can be used.

I claim:

1. In a conveying apparatus for use in mineral mining, said apparatus at least including a curvilinear channel section with a scraper-chain assembly movable along the channel section, the improvement comprising: a housing having a vertical opening extending therethrough, at least one roller rotatably surrounding said housing to contact and guide the scrapers of the scraper-chain assembly during passage along the channel section, and a support extending vertically through said opening, the support being braceable between the floor and the roof of a mine working and being displaceable within said opening independently of the housing and the channel section in a transverse direction relative to the bracing direction.

2. Apparatus according to claim 1, wherein the support employs two hydraulic props.

3. Apparatus according to claim 2, wherein the props are connected to a roof bar and each prop can be shifted relative to the other prop and in a direction parallel to the longitudinal axis of the roof bar.

4. Apparatus according to claim 2, wherein the props are connected to respective components of a roof bar, the roof bar components being relatively movable in the direction of displacement of the support.

5. Apparatus according to claim 2, wherein the props are suspended on a multi-part roof bar.

6. Apparatus according to claim 2, wherein the props are connected to respective parts of a roof-engageable structure, the props may each be selectively retracted to become suspended from the roof-engageable structure for displacement, the parts of the roof-engageable structure being relatively displaceable to permit displacement of the props one relative to the other to thereby effect the support displacement and wherein the props have plates engaging on upper surfaces of the housing to maintain the housing on the floor of the mine working when the props are braced between the floor and the roof of the mine working.

7. Apparatus according to claim 1, wherein the support is provided with at least one retaining device which bears on the housing to hold the housing on the floor of the mine working.

8. Apparatus according to claim 1, wherein the housing and the channel section are rigidly connected together and the housing is provided with means for connection to a shifting ram usable to displace the housing and the channel section relative to the support.

9. Apparatus according to claim 1, wherein two independently rotatable rollers are provided within the housing for guiding upper and lower runs of the scraper-chain assembly.

10. Apparatus according to claim 1, wherein the housing has a top wall provided with an elongate aperture aligned with the direction of displacement of the support.

11. Conveying apparatus comprising: a curvilinear channel section, a scraper-chain assembly movable along the channel section in upper and lower runs, a housing with a hub portion having a vertical opening extending therethrough, annular rollers rotatably surrounding said opening and arranged on said hub portion to contact and guide the scrapers of the scraper-chain assembly during passage along the channel section in the upper and lower runs, and a roof support extending vertically through the opening in the hub portion, the roof support being braceable between the roof and floor of a mine working and being displaceable within said opening in successive steps transversally relative to the bracing direction and independently of the housing and the channel section.

* * * * *